(12) United States Patent
Amaitis et al.

(10) Patent No.: US 11,798,375 B2
(45) Date of Patent: Oct. 24, 2023

(54) SYSTEM AND METHOD FOR BETTING ON A PARTICIPANT IN A GROUP OF EVENTS

(71) Applicant: CANTOR INDEX, LLC, New York, NY (US)

(72) Inventors: Lee M. Amaitis, Palm Beach Gardens, FL (US); Joseph M. Asher, Las Vegas, NV (US); Adam Burgis, London (GB); Dominic Crosthwaite, London (GB)

(73) Assignee: CANTOR INDEX, LLC, New York, NY (US)

( * ) Notice: Subject to any disclaimer, the term of this patent is extended or adjusted under 35 U.S.C. 154(b) by 109 days.

(21) Appl. No.: 17/353,012

(22) Filed: Jun. 21, 2021

(65) Prior Publication Data

US 2021/0319667 A1    Oct. 14, 2021

Related U.S. Application Data

(63) Continuation of application No. 16/391,369, filed on Apr. 23, 2019, now Pat. No. 11,043,078, which is a continuation of application No. 14/315,517, filed on Jun. 26, 2014, now Pat. No. 10,304,292, which is a continuation of application No. 13/615,865, filed on Sep. 14, 2012, now Pat. No. 8,764,558, which is a continuation of application No. 10/667,923, filed on Sep. 22, 2003, now Pat. No. 8,353,763.

(60) Provisional application No. 60/459,561, filed on Mar. 31, 2003.

(51) Int. Cl.
*G06F 17/00* (2019.01)
*G07F 17/32* (2006.01)
*G06Q 40/04* (2012.01)

(52) U.S. Cl.
CPC ......... *G07F 17/3288* (2013.01); *G06Q 40/04* (2013.01); *G07F 17/3244* (2013.01); *G07F 17/3258* (2013.01)

(58) Field of Classification Search
CPC .................... G07F 17/3244; G07F 17/3288
See application file for complete search history.

*Primary Examiner* — Lawrence S Galka

(57) ABSTRACT

A method of managing bets includes receiving first types of bets and second types of bets. Each first type of bet comprises a bet that the number of units earned by a participant in a plurality of events will fall within a first range of numbers. Each second type of bet comprises a bet that the number of units earned by the participant over a course of a plurality of events will fall within a second range of numbers. The total number of units earned by the participant is determined based on the positioning of the participant in each event. The method includes determining whether the first or second type of bets are winning bets. A betting pool is determined based on the total amounts associated with the first and second types of bets. A payout is determined based on the betting pool and the total amounts of the winning bets.

10 Claims, 2 Drawing Sheets

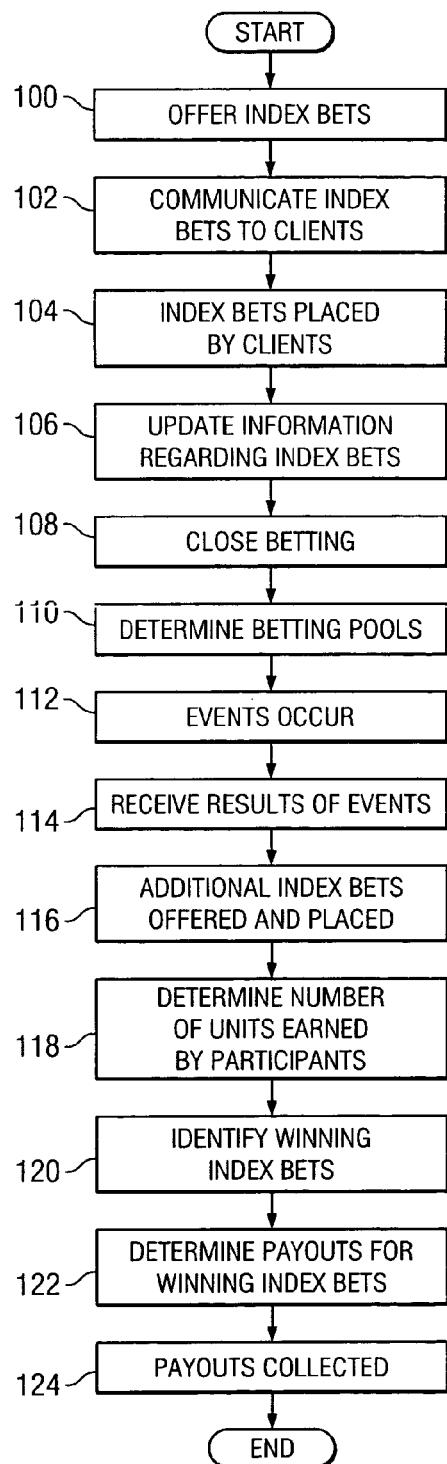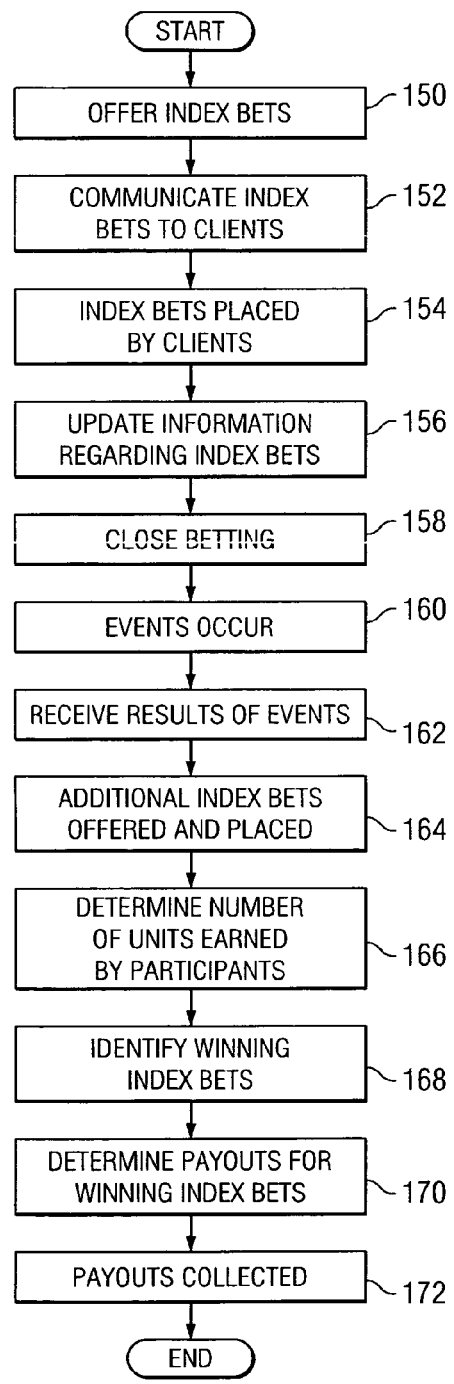

SYSTEM AND METHOD FOR BETTING ON A PARTICIPANT IN A GROUP OF EVENTS

CROSS REFERENCE TO RELATED APPLICATION

This application is a continuation of U.S. patent application Ser. No. 14/315,517 filed Jun. 26, 2014 (now U.S. Pat. No. 10,304,292), which is a continuation of U.S. patent application Ser. No. 13/615,865, filed Sep. 14, 2012 (now U.S. Pat. No. 8,764,558), which is a continuation of U.S. patent application Ser. No. 10/667,923 (now U.S. Pat. No. 8,353,763), filed Sep. 22, 2003, which claims benefit of U.S. Provisional Patent Application No. 60/459,561 filed Mar. 31, 2003, the disclosures of which are incorporated by reference herein in their entireties.

TECHNICAL FIELD OF THE INVENTION

This invention relates in general to betting on events and, more particularly, to a system and method for betting on a participant in a group of events.

BACKGROUND OF THE INVENTION

Wagering on sporting events, such as horse races, for example, is a large and growing industry in many parts of the world. Various types of betting products or systems are available for various types of sporting events. For example, typical horse racing bets allow bettors to bet on a single horse or on several horses in a particular race or series of races. For instance, a bettor can bet on a particular horse to finish first (win), finish in the top two (place), or finish in the top three (show). A bettor may also make various combination bets with multiple horses, such as an exacta bet (covering the top two horses in order) or a trifecta bet (covering the top three horses in order). In addition, a bettor may bet on a series of races, such as the daily double (winners of two consecutive races), the pick-three (winners of three consecutive races), and the pick-six (winners of six consecutive races), for example.

In a pari-mutuel betting system, all bets regarding a particular event are aggregated, a commission (or "takeout") is taken by the track, and the remainder is distributed among the winning bettors. For example, pari-mutuel betting systems are commonly used in North America (and other various places throughout the world) for betting on horse races.

SUMMARY OF THE INVENTION

In one embodiment, a method of managing bets is provided. The method may include receiving one or more first type of bets and one or more second type of bets. Each first type has an associated bet amount and comprises a bet that the total number of units earned by a particular participant over a course of a plurality of events will fall within a first range of numbers. Each second type of bet has an associated bet amount and comprises a second bet that the total number of units earned by the particular participant in the plurality of events will fall within a second range of numbers. The total number of units earned by the particular participant may be determined based at least in part on the positioning of the particular participant in each of the plurality of events. The method may further include determining whether the first type of bets or the second type of bets are winning bets based at least in part on whether the total number of units earned by the particular participant falls within the first range of numbers or the second range of numbers. A betting pool may be determined based at least in part on the total of the bet amounts associated with the first type of bets and the total of the bet amounts associated with the second type of bets, and an amount of a payout may be determined based at least in part on the betting pool and the total of the bet amounts associated with the winning bets.

In yet another embodiment, another method of managing bets is provided. The method may include, for each of a plurality of participants participating in one or more of a plurality of events, receiving one or more participant bets. Each participant bet has an associated bet amount and comprises a bet that the number of units earned by that participant over the course of the plurality of events will exceed a particular index number before the number of units earned by any other of the plurality of participants exceeds the particular index number. For each of the plurality of participants, the total number of units earned by that participant may be determined based at least in part on the positioning of that participant in at least a portion of the plurality of events in which that participant participates. The method may further include determining as the winning participant the participant for which the number of units earned by that participant exceeds the particular index number before the number of units earned by any other of the participants exceeds the particular index number. The method may further include identifying winning participant bets based at least in part on the determined winning participant.

Various embodiments of the present invention may benefit from numerous advantages. It should be noted that one or more embodiments may benefit from some, none, or all of the advantages discussed below.

One advantage is that a betting provider may allow clients to place index bets on the performance of a particular participant in a plurality of betting events, such as a jockey in a group of horse races or a driver in a group of car races, for example. Thus, bettors may place wagers on particular participants for a series of events, rather than on each individual event. In addition, a bettor may "cash out" or settle an index bet during the life of the bet in order to mitigate potential losses or lock in guaranteed gains.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 2 illustrates one embodiment of a method for placing index bets in a pari-mutuel betting system; and FIG. 3 illustrates one embodiment of a method for placing index bets in a spread betting system.

DETAILED DESCRIPTION OF EXAMPLE EMBODIMENTS OF THE INVENTION

Figure 1:
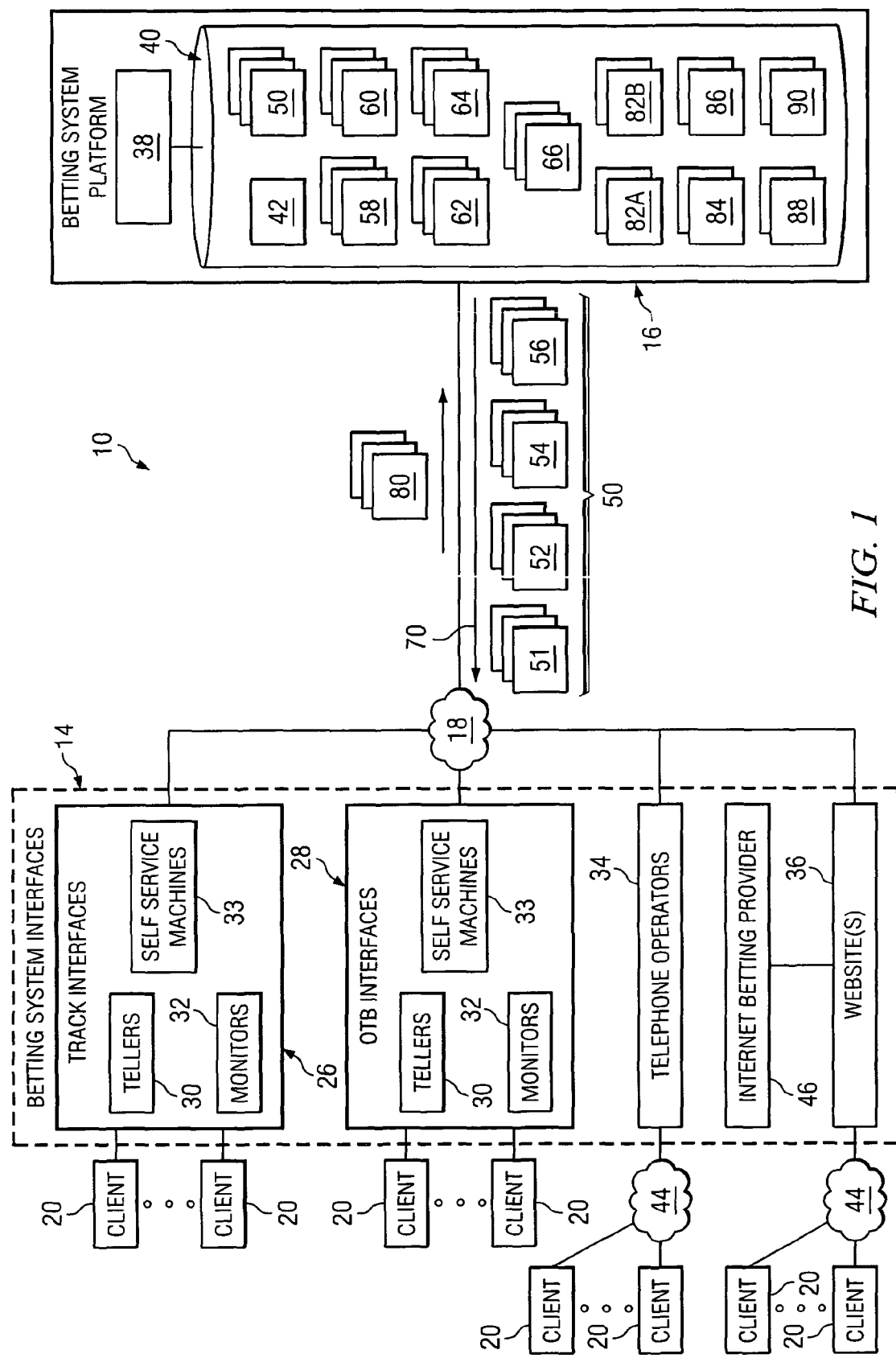
FIG. 1 illustrates an example system for receiving and managing index bets in accordance with an embodiment of the present invention.

FIG. 1 illustrates an example system 10 for receiving and managing index bets 80 in accordance with an embodiment of the present invention. System 10 includes one or more betting system interfaces 14 and a betting system platform 16 coupled by one or more communication networks 18. In general, one or more clients 20 may receive betting information (such as event times, betting rules, betting options and odds, for example) and/or place index bets 80 via betting system interfaces 14. Betting system interfaces 14 communicate such index bets 80 received from clients 20 to betting system platform 16. Betting system platform 16 stores the received index bets 80, determines appropriate odds and payouts, and communicates such odds and payouts to one or more of the betting system interfaces 14.

System 10 permits clients 20 to place one or more types of index bets 80 on a plurality of betting events having a plurality of event participants, such as a plurality of horse races, dog races, or auto races, for example. The participants in such betting events may include jockeys, drivers, horses or dogs, for example. For some groups of events, the participants in each event are the same. For other groups of events, the participants in each event may be different. For example, for an index bet 80 based on a particular jockey in a group of ten horse races, the set of jockeys riding in each race may change from race to race, and the particular jockey may be racing in only six of the ten races.

As shown in FIG. 1, particular types of index bets 80 may include over/under index bets 82, range index bets 84, head-to-head index bets 86, purse index bets 88 and/or multi-card index bets 90. Betting system platform 16 may establish or permit one or more various types of betting formats for each type of index bet 80. For example, as discussed below, betting system platform 16 may allow clients 20 to place one or more types of index bet 80 according to a pari-mutuel format and/or a spread betting format.

In a pari-mutuel betting format, each index bet 80 may have an associated bet amount, which defines the amount that the client 20 placing the index bet 80 wishes to wager on the bet. In a spread betting format, each index bet 80 may have an associated quote and unit stake. The unit stake may define the amount per unit (such as per point or per dollar, for example) above or below the quote that the client 20 placing the index bet 80 wishes to wager. For example, suppose in a spread betting format that a client 20 places an index bet 80 for a unit stake of $2 per point that a particular jockey will score more than 172 points (the quote) over a series of eight races. If the jockey scores 190 points, the client 20 would win $36, or (190 points−172 points)*(2/point). However, if the jockey scores only 162 points, the client 20 would lose $20, or (172 points−162 points)*($2/point).

One or more types of index bets 80 may comprise bets, or participant bets, regarding the total number of units earned by one or more particular participants in a plurality of betting events, such as particular participant in a group of horse races, dog races, or auto races, for example. The betting events may include any events in which a plurality of participants compete for positions. Some types of index bets 80, such as some over/under index bets 82, for example, may comprise a bet regarding one particular participant, while other types of index bets 80, such as some head-to-head bets 84, for example, may comprise a bet regarding more than one particular participant.

For some index bets 80, the plurality of events may occur within a particular day, such as a group of horse races or car races for example. For other bets, the plurality of events may occur over a more extended period of time, such as a week, month, season or year, for example. For example, a particular index bet 80 may be a bet regarding the total purse money won by a particular jockey in the month of June.

The units earned by various participants may comprise any suitable type of unit, such as wins, positions, points, or monetary units (such as dollars or pounds), for example. Moreover, each index bet 80 may comprise an associated unit distribution structure that defines the rules or structure for distributing units among the participants in each of the plurality of events. For example, as discussed in greater detail below, the unit distribution structure for an index bet 80 may define the distribution of units over a particular number of positions (such as the top three finishers, for example) in each of the plurality of events. For some index bets 80, the unit distribution structure may comprise the purse distribution structure, which defines the distribution of the purse in each of the plurality of events. For example, a typical thoroughbred purse distribution structure awards 60% of the purse to the winner, 20% to the second place horse, and lesser amounts to certain other finishers. For other index bets 80, the unit distribution structure may parallel the typical standardbred purse distribution structure and award 50 points for a win, 25 points for second, 12 points for third, 8 points for fourth and 5 points for fifth.

The unit distribution structure for other index bets 80 may be similar to, or at least based on, such thoroughbred purse distribution structures or standardbred point distribution structure, and may use units other than monetary units or points. For dead heats between two participants in an event, the units awarded for the two or more positions may be added together and divided by two, and each of the two participants may be awarded the resulting number of units. For example, for a dead heat for second place in a horse race in which the standardbred point distribution structure is used, each of the two participants in the dead heat would be awarded 18.5 points (25 points+12 points=37 points/2=18.5 points).

Over/under index bets 82 and range index bets 84 comprise bets that the total number of units earned by a particular participant over a course of a plurality of events will fall within a particular range of numbers. The particular participant is selected from a plurality of participants that each participate in at least one of the plurality of events. For example, the particular participant may be a particular jockey or driver that participates in at least two races in a group of races, such as a group of races on a race card (such as a group of races to be run at a track in one day, for example).

Over/Under Index Bets

Over/under index bets 82 comprise bets that the total number of units earned by a particular participant over a course of a plurality of events will either be over or under a particular index number determined for the bet. Over/under index bets 82 include both over bets 82A and under bets 82B. Over bets 82A comprise bets that the total number of units earned by the particular participant in the plurality of events will fall within the range of numbers above the index number (i.e., between the index number and infinity, or the maximum possible number of units), while under bets 82B comprise bets that the total number of units earned by the particular participant in the plurality of events will fall within the range of numbers below the index number (i.e., between zero, or the minimum possible number of units, and the index number). Thus, over/under index bets 82 may be considered as a type of range index bets.

The index number for an over/under index bet 82 regarding a particular participant may represent the estimated or predicted total number of units that will be earned by the particular participant over the course of the group of events. The index number may be determined by betting system platform 16, and may be based on a variety of parameters, such as historical data regarding the type of the plurality of betting events, the particular participant, the number of participants in each of the plurality of events, the type of units (such as points, wins, or dollars, for example), and the unit distribution structure for the plurality of events, for example. In some situations, the index number for an over/under index bet 82 regarding a particular participant may be determined based at least on a track handicapper's view of the strength of the mounts in each event. The index number for each over/under index bet 82 associated with a particular betting location may be provided to clients 20. For example, index numbers for over/under index bets 82 may be published in the official track program or communicated to clients 20 via one or more various betting system interfaces 14.

Clients 20 who think that the particular participant covered by an over/under index bet 82 will earn more units than the index number over the course of the plurality of events would likely place an over bet 82A, while clients 20 who think that the particular participant covered by an over/under index bet 82 will earn less units than the index number over the course of the plurality of events would likely place an under bet 82B.

The index number for an over/under index bet 82 may be set at an integer plus some fraction such that landing exactly on the index number is unlikely or impossible. For example, the index number for an over/under index bet 82 may be set at X and ⅓, where X is an integer. Using a fraction such as ⅓ rather than ½ or ¼ may reduce or eliminate the possibility of the particular participant earning the exact number of units as the index number, since participants may earn ½ or ¼ of a unit due to one or more dead heats.

As the plurality of events covered by an over/under index bet 82 occur, betting system platform 16 may determine the number of units earned by the particular participant based at least on the positioning of the particular participant in each events and the relevant unit distribution structure. Betting system platform 16 may maintain and communicate a running total of units earned by the particular participant to clients 20 via one or more various betting system interfaces 14. Betting system platform 16 may determine whether the over bets 82A or under bets 82B are winning bets after the plurality of events are completed or at some earlier point, such as if the units earned by the particular participant exceed the index number or if it becomes impossible for the particular participant to earn the remaining number of units required to reach the index number, for example.

In a pari-mutuel system, the payout for winning over/under index bets 82 may be calculated as follows. First, the total of the bet amounts for each over bet 82A and the total of the bet amounts for each under bet 82B are combined to create a betting pool. A take-out or commission may be removed from the betting pool. The take-out or commission may be any suitable amount of the betting pool, such as 10% or 15% of the betting pool, for example. The remaining portion of the betting pool may then be divided among all winning bets, in proportion to the bet amount of each winning bet.

For example, suppose that Client A and Client B bet $50 and $100 respectively on the jockey Campbell to finish "over" the index number, while Client C bet $250 on the jockey Campbell to finish "under" the index number. The betting pool is thus $400. Assuming the take out is 10%, $40 is removed from the betting pool, leaving $360. Suppose that Campbell finishes "over" the index number, and thus Client A's and Client B's over bets are winning bets. The remaining betting pool ($360) is then divided between Client A and Client B, in proportion to the bet amount of each of Client A and Client B. Thus, $120 is paid out to Client A and $240 is paid out to Client B.

In some embodiments, betting system platform 16 may close the betting pool proximate the start of the first event of the plurality of events. Alternatively, betting system platform 16 may close the betting pool proximate the start of the first event in which the particular participant is participating, which may or may not be the first of the plurality of events. In some embodiments, pre-set adjustments may be made in the event of a late scratch or other similar event, such as a cancelled race or the late scratch of one of the horses which was to be ridden by the jockey covered by an over/under index bet 82. Alternatively, the track may set rules such that no adjustments are made for such events.

In some embodiments, betting system platform 16 may offer new over/under index bets 82 for the same participant after one or more (or after each) of the events in the plurality of events has occurred, to permit additional betting based on the performance of the participant up to that point. This may be useful to accommodate clients 20 who miss one or more of the group of events, such as clients 20 arriving late at the track. Each new over/under index bets 82 may comprise a bet regarding the total number of units that will be earned by the participant in each of the remaining events (or in other words, the total number of units earned by the participant in the plurality of events excluding any of the events that have already occurred). A new index number may be determined for each new over/under index bet 82 for a particular participant, based on the performance of that participant in the events that have already occurred. Generally, if the participant has performed well and earned a relatively large number of units, the index number will increase for subsequent over/under index bets 82 for that participant, and vice versa.

In addition, over/under index bets 82 may be structured such as to permit a client 20 to "cash out," or request and receive a settlement payment for his or her bet after one or more of the plurality of events have occurred. This may allow a client 20 to limit his or her win/loss possibilities to take advantage of the results of events that have occurred. For example, if jockey Campbell (covered by an over/under index bet 82) were to win an early race on a longshot, the index number for a new over/under index bet 82 offered after the early race would be higher than that of the original over/under index bet 82. A client 20 who originally placed an over bet 82A on Campbell could capitalize on the movement of the index number by requesting to terminate his original bet and receive a settlement payment (i.e., "cashing out"). The settlement payment for client 20 may be determined based at least on the difference between the index number of the original over/under index bet 82 and the higher index number of the new over/under index bet 82 offered after the early race.

Similarly, if jockey Campbell lost an early race on a heavy favorite, the index number for a new over/under index bet 82 offered after the early race would be lower than that of the original over/under index bet 82. A client 20 who originally placed an over bet 82A on Campbell may wish to mitigate his or her losses by "cashing out." The settlement payment for client 20 may be determined based at least on the difference between the index number of the original over/under index bet 82 and the lower index number of the new over/under index bet 82 offered after the early race.

To cash out an index bet 80, a client 20 may use any suitable betting system interface 14 to request that the index bet 80 be settled. Betting system platform 16 may receive the request, determine the appropriate settlement payment for the client 20, and cancel the original index bet 80. Betting system platform 16 may also cause the payment of the settlement payment to the client 20, such as by communicating a message to a teller 30 approving the payment of the settlement payment, for example.

In addition to the pari-mutuel format discussed above, over/under index bets 82 may be offered in a spread betting format. In the spread betting format, an over/under index bet 82 has an associated quote and unit stake. The quote may comprise an index number, such as described above, or pair of index numbers including an upper index number and a lower index number, thus creating a spread. The unit stake defines the amount per unit (such as per point or per dollar, for example) above or below the quote that the client 20 placing the over/under index bet 82 wishes to wager. In a situation in which the quote comprises a pair or spread of index numbers, an over bet 82A comprises a bet that the total number of units earned by the particular participant will be greater than the upper index number, while a lower bet 82B comprises a bet that the total number of units earned by the particular participant will be less than the lower index number.

In a spread betting system, the payout for an over/under index bet 82 regarding a particular participant may be determined based at least on the quote, the unit stake, and the total number of units earned by the particular participant. In one embodiment, the payout is determined by multiplying the unit stake by the difference between the quote and the total number of units earned by the particular participant.

For example, suppose in a spread betting format an over/under index bet 82 for a particular driver Jones in a group of car races. The over/under index bet 82 has a spread quote of 212⅓–214⅓. Suppose a client 20 places an under bet 82B for a unit stake of $1/point. If Jones ends up scoring a total of 192 points over the course of the plurality of events, the client 20 would win (212⅓–192)*($1/point), or $20.33. However, if Jones scored a total of 220 points, the client 20 would lose (220–212⅓)*($1/point), or $7.67. Now supposing that another client 20 places an over bet 82A for a unit stake of $1/point. If Jones ends up scoring a total of 220 points over the course of the plurality of events, the client 20 would win (220–214⅓)*($1/point), or $5.67. However, if Jones scored only 200 points, the client 20 would lose (214⅓–200)*($1/point), or $14.33.

Range Index Bets

As discussed above, range index bets 84 comprise bets that the total number of units earned by a particular participant over a course of a plurality of events will fall within a particular range of numbers. Betting system platform 16 may define or establish any suitable number of ranges for each range index bet 84, such as, for example, based upon an index number established by a track handicapper. For example, for a particular range index bet 84 regarding the number of points earned by a jockey in a group of horse races, betting system platform 16 may define or establish the following ranges of points: Range 1=under 150; Range 2=150-179⅓; Range 3=179⅓-199⅓; Range 4=199⅓-219⅓; Range 5=219⅓-239⅓; Range 6=239⅓-269⅓; and Range 7=over 269⅓.

If the jockey earned a total of 198 points in the designated group of races, range index bets 84 on Range 3 would be winning bets. As discussed above with over/under index bets 82, one or more subsequent range index bets 84 may be offered for the same jockey after one or more races occur. Each range of numbers may change for such subsequent range index bets 84, depending on the performance of the jockey up to that point.

The ranges for a particular range index bet 84 may be determined based at least in part on an index number which represents the estimated or predicted total number of units that will be earned by the particular participant over the course of the group of events. As described above, such index numbers may be determined by a track handicapper or otherwise by betting system platform 16 based on various parameters.

The payout for range index bets 84 may be determined according to traditional pari-mutuel principles. For example, suppose for the range index bet 84 discussed above that 100 was bet on Range 1, $200 on Range 2, $300 on Range 3, $400 on Range 4, $500 on Range 5, $600 on Range 6, and $700 on Range 7. Assume that the take out is 20%. Suppose again that the jockey earned a total of 198, and that range index bets 84 on Range 3 are winning bets.

The payout for bets on Range 3 may be calculated as follows. First, the total of the bet amounts for range index bets 84 made for each range (Ranges 1-7) are combined to create a betting pool, which is equal to $2,800. The 20% take-out (or $560) or commission may be removed from the betting pool, leaving $2,240, which may then be divided among all winning bets (i.e., bets on Range 3), in proportion to the bet amount of each winning bet.

As discussed above regarding over/under index bets 82, range index bets 84 may be structured such as to permit a client 20 to "cash out," or request and receive a settlement payment for his or her range index bet 84 after one or more of the plurality of events have occurred. This may allow a client 20 to limit his or her win/loss possibilities to take advantage of the results of events that have occurred, such as discussed above.

Head-to-Head Index Bets

Head-to-head index bets 86 comprise bets regarding the number of units earned by a particular participant over the course of the plurality of events as compared to the number of units earned by other participants in the plurality of events. For example, some head-to-head index bets 86 comprise a bet that the number of units earned by a participant will exceed an index number before the number of units earned by any other participant exceeds the index number. Other head-to-head index bets 86 comprise a bet that a particular participant will earn more units over the course of the plurality of events than any other participant.

For a particular group of events, betting system platform 16 may offer head-to-head index bets 86 for each of the participants participating in any of the group of events. Alternatively, betting system platform 16 may offer head-to-head index bets 86 for only a particular subset of the participants participating in any of the group of events. For such situations, a head-to-head index bet 86 for a particular participant may comprise a bet that that participant will outperform (such as by earning more total units or by being the first participant to reach a predetermined index number, as discussed above) only those other participants for whom head-to-head index bets 86 are offered. Thus, for example, if head-to-head index bets 86 are offered for only three drivers in a group of races, a head-to-head index bet 86 regarding one of the drivers comprises a bet that that driver will outperform the other two drivers for which head-to-head index bets 86 are offered, regardless of the performance of any other drivers in the group of races.

For head-to-head index bets 86 that comprise a race to a predetermined index number, in the event that none of the participants reaches the index number, the participant with the highest total number of units would be the winning participant, in one embodiment, for the purpose of determining which head-to-head index bets 86 are winning bets. In addition, in a situation in which two or more participants reach the index number in the same event, the participant with the highest total number of units after that event would be the winning participant for the purpose of determining which head-to-head index bets 86 are winning bets. The index number used for head-to-head index bets 86 that comprise a race to an index number may be determined by betting system platform 16 based on various parameters.

As with any of the types of index bets 80, head-to-head index bets 86 may be offered before the start of the first of the group of events, or after one or more of the events have occurred. Offering head-to-head index bets 86 which begin after one or more of the events have occurred may allow clients 20 who have missed one or more of the group of events, such as clients 20 arriving late at the track, to make head-to-head index bets 86. In addition, offering head-to-head index bets 86 after one or more of the events may allow clients 20 more time to analyze various events or event participants.

The payout for head-to-head index bets 86 may be determined according to traditional pari-mutuel principles. For example, suppose a group of races in which head-to-head index bet 86 are offered for three different drivers, Smith, Brown, and Johnson, the index number is 100 points, and that the take-out is 15%. Suppose that $300 was bet on Smith, $500 on Brown, and $200 on Johnson, and that Smith reaches 100 points first.

The payout for clients 20 who placed head-to-head index bet 86 on Smith may be calculated as follows. First, the total of the bet amounts for head-to-head index bets 86 on each of the three drivers are combined to create a betting pool, which is equal to $1,000. The 15% take-out (or $150) may be removed from the betting pool, leaving $850, which may then be divided among all winning bets (i.e., bets on Smith), in proportion to the bet amount of each winning bet.

As discussed above regarding over/under index bets 82 and range index bets 84, head-to-head index bet 86 may be structured such as to permit a client 20 to "cash out," or request and receive a settlement payment for his or her head-to-head index bet 86 after one or more of the plurality of events have occurred. This may allow a client 20 to limit his or her win/loss possibilities to take advantage of the results of events that have occurred, such as discussed above.

Purse Index Bets

Purse index bets 88 may comprise any of the types of index bets 80 described above in which the relevant units is the amount of purse money earned or won by a particular participant in the plurality of events. Thus, for purse index bets 88, the unit distribution structure is equal to the purse distribution structure for each of the events. Thus, instead of using points or some other form of units, purse index bets 88 are based on the amount of purse money won by the participant (or the participant's horses) over the course of the groups of events.

For one or more types of purse index bets 88, an index number may be determined which represents an amount of purse money to be earned by the participant (or the participant's horses) over the course of the groups of events. Thus, for over/under purse index bets 88, a track handicapper or betting system platform 16 could establish an amount of purse money (such as $45,000, for example) as an index number for clients 20 to place bets on whether the designated participant will win more or less purse money than the index number.

Unlike index bets 80 which are based on a point system as described above, purse index bets 88 distinguish between winning races with different size purses. Thus, purse index bets 88 may distinguish between winning high-stakes (or important) races and winning an ordinary claiming race. To help clients 20 calculate the possible purse monies to be won in order to analyze and place purse index bets 88, betting system platform 16 may provide to clients 20 via one or more betting system interfaces 14 a breakdown of the amount to be awarded to each finisher (or a particular number of top finishers) in each event in the group of event.

Various types of purse index bets 88 may be offered using pari-mutuel and/or spread betting formats, such as described above with reference to over/under index bets 82, range index bets 84, and head-to-head index bets 86.

Multi-Card Index Bets

Multi-card index bets 90 comprise any of the types of index bets 80 described above in which the group of events occur over an extended period of time, which may include multiple "cards," or subsets of events. Example multi-card index bets 90 may include bets regarding the jockey, driver (or other type of participant) of the week, month, season or year, in which the winning participant is determined in any of a variety of manners, such as by wins, purse money, or according to a unit distribution structure as discussed above, for example.

In some embodiments, for particular head-to-head multi-card index bet 90, each multi-card index bet 90 regarding a particular participant comprises a first bet portion regarding the number of units earned by that participant in a subset of the plurality of events and a second bet portion regarding the number of units earned by that participant in the plurality of events. For example, the first bet portion of each multi-card index bet 90 may comprise a bet that the number of units earned by the designated participant in the subset of the plurality of events will be greater than the number of units earned by any of the other participants in the subset of the plurality of events, while the second bet portion comprises a bet that the number of units earned by the designated participant in the plurality of events will be greater than the number of units earned by any of the other participants in the plurality of events. For example, a particular head-to-head multi-card index bet 90 on a particular jockey Campbell may include a first bet portion regarding the number of wins that the jockey Campbell will win throughout June, 2003 and a second bet portion regarding the number of wins that the jockey Campbell will win throughout all of 2003.

A predetermined percentage of the betting pool collected for such multi-card index bet 90 may be designated for each bet portion of the multi-card index bet 90. A first payout amount may be determined for the first bet portion based at least on the collected betting pool and the predetermined percentage of the betting pool allocated for winning the first bet portion, and a second payout amount may be determined for the second bet portion based at least in part on the betting pool and the predetermined percentage of the betting pool allocated for winning the second bet portion.

For example, supposing a client 20 placed a $10 multi-card index bet 90 on jockey Armstrong at the start of June at Belmont Park. Assuming a 20% take-out and that the total pool is divided equally between a June jockey pool and a end-of-season jockey pool, $4 of that $10 would be allocated to the June jockey pool and $4 would be allocated to the end-of-season jockey pool. If a total of $100,000 was bet in the jockey pool, $40,000 may be divided among those clients 20 who correctly bet on the leading jockey for June, while the remaining $40,000 may be placed in the end-of-season pool and later divided among those clients 20 who correctly bet on the leading jockey for the season.

The payout for such multi-portion multi-card index bets 90 may be determined as follows. In the example discussed above, suppose that of the $100,000 jockey pool, $30,000 was bet on jockey Armstrong, $50,000 was bet on jockey Vincent, $10,000 was bet on jockey McGee, and $10,000 was bet on jockey Luis. With a 20% take-out, assuming Armstrong was the leading rider in June, the payout for the portion of the bet covering June would be $1.33 for each $1 bet on Armstrong ($100,000-$20,000 take-out=$80,000/2 equal portions of the pool=$40,000 to be paid out on the $30,000 bet on Armstrong=$1.33 for each $1 bet on Armstrong). The remaining $40,000 would remain in the pool to be paid to those clients 20 who correctly bet on the leading jockey for the season. Supposing that Vincent was the leading jockey for the season, the $40,000 would be divided among clients 20 who bet on Vincent, in proportion to the size of such bets. In other words, the payout for the portion of the bet covering the entire season would be 0.80 for each $1 bet on Vincent ($40,000 to be paid out on the $50,000 bet on Vincent=$0.80 for each $1 bet on Vincent).

Betting system interfaces 14 may include any suitable interface between a client 20 and betting system platform 16. For example, as shown in FIG. 1, betting system interfaces 14 may include physical interfaces, such as track interfaces 26 and/or off-track interfaces 28. Track interfaces 26 are generally located at a track, while off-track interfaces 28 are generally located at an off-track-betting (OTB) establishment, such as an OTB parlor. Track interfaces 26 and off-track interfaces 28 may include tellers 30, which may receive index bets 80 from and distribute payouts to clients 20, and/or monitors 32, which may be viewed by clients 20 to monitor betting information such as the event time, the current odds, and the projected or actual payouts for various index bets 80, for example. In some situations, such information may be updated substantially in real time or at preset intervals (such as every 30 seconds, for example) as new index bets 80 are placed and/or as information regarding the event changes, for example. Monitors 32 may include, for example, tote-boards or closed-circuit televisions located at a track or OTB establishment.

Track interfaces 26 and/or off-track interfaces 28 may also include one or more self-service betting machines 33. In some embodiment, self-service betting machines 33 allow clients 20 to insert payment into the machine (such as cash or by using a voucher or a credit or debit card), place one or more bets 80 and receive a printout (such as a ticket, for example) indicating the bet or bets placed. Printouts for winning bets may be inserted into the self-service betting machine, such as to receive a payment voucher (which may be used to receive a payout from a teller 30) or to place additional index bets 80. In other embodiments, self-service betting machines 33 allow clients 20 to use a credit card, a debit card, or a smart card to place index bets 80. The credit or debit card may have an associated account, which may be a betting account provided and/or managed by a betting account provider using, for example, a centralized computer system. The smart card may itself store information regarding a betting account and various bets, or may also be linked to a betting account using a centralized computer system. In some embodiments, after the betting event is completed, a client 20 may insert or swipe his or her credit, debit, or smart card in the self-service betting machines 33 in order to update the balance on the card. Self-service betting machines 33 may also allow the client 20 to print out payment vouchers which may be presented to a teller 30 in order to receive payments.

As shown in FIG. 1, betting system interfaces 14 may also include various non-physical interfaces, such as one or more telephone operators 34 and one or more websites 36. Clients 20 may access or communicate with such non-physical interfaces via one or more communication networks 44. Communication networks 44 may include one or more servers, routers, switches, repeaters, backbones, links and/or any other appropriate type of communication devices coupled by links such as wire line, optical, wireless, or other appropriate links. In general, communication network 44 may include any interconnection found on any communication network, such as a telephone network, a local area network (LAN), metropolitan area network (MAN), wide area network (WAN), the Internet, portions of the Internet, or any other data exchange system. To access betting system interface 14 using communication networks 44, clients 20 may use a computer, a personal digital assistant (PDA), a cell-phone, a remote paging device, an electronic mail communication device, a handheld betting device, or any other suitable mobile device. In certain embodiments, clients 20 may receive any suitable information, such as betting information, from betting system platform 16 via mobile devices using, for example, communication networks 44 and betting system interfaces 14.

Telephone operators 34 may communicate betting information to, and take index bets 80 from, clients 20. Similarly, websites 36 may communicate betting information to clients 20 and allow clients 20 to place index bets 80. One or more of such websites 36 may be hosted by one or more servers associated with system 10, which server or servers may also host betting system platform 16 in some embodiments. In some embodiments, betting information available to clients 20 via websites 36 may be updated substantially in real time or at preset intervals (such as every 30 seconds, for example) as new index bets 80 are placed and/or as information regarding the event changes, for example.

In some embodiments, one or more websites 36 may be provided by, or associated with, an Internet betting provider 46, for example. Internet betting provider 46 may provide Internet account wagering by providing online betting accounts to one or more clients 20. Using an online betting account, a client 20 may interface with one or more websites 36 associated with the Internet betting provider 46 in order to fund the account, view betting information regarding betting events, and place bets. Such online betting accounts may include one or more various types of accounts, such as deposit accounts, credit accounts, stop-loss accounts, and hybrid accounts, for example.

As discussed above, betting system platform 16 is operable to receive index bets 80 from betting system interfaces 14, store the received index bets 80, determine appropriate index numbers, quotes, odds and/or payouts, and communicate such index numbers, quotes, odds and/or payouts to one or more of the betting system interfaces 14, which may then display such index numbers, quotes, odds and/or payouts to clients 20.

As shown in FIG. 1, betting system platform 16 includes a processor 38 coupled to a memory 40. Processor 38 is generally operable to execute various algorithms or calculations to determine current bet data 50, such as index numbers 51, bet amounts 52, betting pools 54 and/or potential payout data 56. Processor 38 may comprise any suitable processor that executes a betting system software application 42 or other computer instructions, such as a central processing unit (CPU) or other microprocessor, and may include any suitable number of processors working together. Memory 40 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Memory 40 is generally operable to store various information that may be used by processor 38 in determining index numbers, quotes, odds and/or payouts. For example, memory 40 may comprise any suitable number of databases, which may be co-located or physically and/or geographically distributed. In the example shown in FIG. 1, memory 40 may store any or all of the following: betting system software application 42, current bet data 50, one or more event parameters 58, one or more bet parameters 60, one or more calculation rules 62, one or more event results 64, and one or more bet results 66.

Event parameters 58 may comprise various parameters of one or more betting events, such as, for example, the type of event, the time, date and location of the event and/or the number (or in some cases, the name) of each of the participants in the event. Bet parameters 60 may comprise various parameters of one or more received index bets 80, such as the identity of the client 20 who placed the bet 80, the manner in which the bet 80 was placed (such as via telephone, the Internet, or in person at a track or OTB establishment, for example), the type of bet 80, the commission rate on the bet 80, the participant or participants covered by the bet 80 and/or the amount of the bet 80, for example. Calculation rules 62 may comprise various equations or other algorithms to be used by processor 38 in determining various current bet data 50. Event results 64 may comprise various data regarding the results of one or more betting events, such as the final position of each participant in an event, whether there was a tie or dead heat for any position and/or whether any participants did not finish the event, for example. Bet results 66 may comprise various data regarding the results of various index bets 80, such as the identity of the client 20 who placed the bet 80, whether the bet 80 was a winning bet, the determined payout for the bet 80 and/or whether the payout was distributed to the client 20, for example.

As discussed above, one or more communication networks 18 couple and facilitate wireless or wireline communication between one or more betting system interfaces 14 and betting system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

As discussed above, processor 38 is operable to execute betting system software application 42 to determine current bet data 50, such as index numbers 51, bet amounts 52, betting pools 54 and/or potential payout data 56. Processor 38 may determine such current bet data 50 based at least on data received from memory 40 and/or one or more betting system interfaces 14. In addition, processor 38 may update such current bet data 50 based on new information being received by betting system platform 16. In some embodiments, processor 38 may update current bet data 50 in real time, substantially in real time, or at preset intervals (such as every 30 seconds, for example).

As shown in FIG. 1, current bet data 50 may be communicated to one or more betting system interfaces 14 via communication network 18, as indicated by arrow 70. Current bet data 50 may then be made available to clients 20, such as via tote boards or monitors 32 located at a track or OTB establishment, for example, or on an appropriate website 36 that may be accessed by clients 20, for example. In this manner, clients 20 may have access to real-time or substantially real-time current bet data 50 regarding various betting events.

FIG. 2 illustrates an example method of placing various index bets 80 in a pari-mutuel betting system according to an embodiment of the present invention. At step 100, one or more types of index bets 80 are offered by betting system platform 16 for a plurality of events having a plurality of participants. For example, for a day of horse racing at Kentucky Downs, betting system platform 16 may offer over/under index bets 82 for jockey Goodman who is racing in six of the ten races on the race card for that day. Suppose betting system platform 16 assigns an index number of 85 to the index bets 82 such that the index bets 82 include over bets 82A that jockey Goodman will earn 85 or more points during the day and under bets 82B that jockey Goodman will earn less than 85 points during the day.

At step 102, various information regarding the types of index bets 80 offered at step 100 may be communicated to clients 20 via various betting system interfaces 14 shown in FIG. 1, such as monitors 32 at a track or OTB establishment or various websites 36, for example. Information regarding various types of index bet 80 offered for the plurality of events may also be included in race programs available at tracks or OTB establishments. Such information may include, for example, the details of the offered index bets 80, such as the participant covered by each index bet 80 and/or the rules of each index bet 80, as well as current bet data 50, such as index numbers 51, bet amounts 52, betting pools 54 and/or potential payout data 56 for the types of index bet 80 offered by betting system platform 16. In the example discussed above, betting pools 54 and/or potential payout data 56 for the over bets 82A and under bets 82B for jockey Goodman may be displayed on monitors 32 and websites 36.

At step 104, clients 20 may place index bets 80 using various betting system interfaces 14 shown in FIG. 1, such as tellers 30 or self-serving machines 33 at tracks or OTB establishments, or websites 36, for example. In the example discussed above, clients 20 may wager various amounts on over bets 82A and under bets 82B for jockey Goodman. At step 106, various information regarding the types of index bet 80 placed for the plurality of events may be updated in real-time, substantially in real-time, or at regular intervals based on index bets 80 placed by clients 20. In the example discussed above, the betting pools 54 and/or potential payout data 56 for over bets 82A and under bets 82B for jockey Goodman may be updated on monitors 32 and websites 36 in real-time, substantially in real-time, or at regular intervals.

At step 108, betting system platform 16 may close the betting on particular index bets 80 before the start of the first of the plurality of events covered by the particular index bets 80, such as the first race in a group of races, for example. In the example discussed above, betting system platform 16 may close the betting on over bets 82A and under bets 82B for jockey Goodman just before the start of the first race.

At step 110, betting system platform 16 may determine the betting pools for index bets 80 based at least in part on the total amounts wagered on each type of index bet 80. In the example discussed above, betting system platform 16 may determine a betting pool by calculating the total amounts wagered on over bets 82A and under bets 82B for jockey Goodman.

At step 112, the plurality of events covered by the index bets 80 occur, such as the running of a group of horse or car races, for example. In the example discussed above, the horse races at Kentucky Downs are run at step 112. At step 114, results of the events, including the positioning of the participants in each event, are received by betting system platform 16.

At step 116, additional index bets 80 may be offered and placed after one or more of the plurality of events have occurred. The terms of such late index bets 80 may be different from the terms of the index bets 80 placed before the start of the first event. For example, for over/under index bets 80, the index number 51 may be adjusted based on the results of the events that have already occurred. For range index bets 84, the each of the ranges may be adjusted from the original ranges. In addition, a new betting pool may be opened for new index bets 80 offered after a particular number of events have occurred. In the example discussed above, over bets 82A and under bets 82B may be offered and placed after one or more of the races at Kentucky Downs, one or more of which jockey Goodman may have raced in.

At step 118, betting system platform 16 may determine the number of units earned various participants in the plurality of events based at least in part on the positioning of the various participants in each event. In the example discussed above, the total number of points earned by jockey Goodman during the day at Kentucky Downs is calculated based on the position of jockey Goodman in each of the races in which jockey Goodman participated.

At step 120, betting system platform 16 may determine which index bets 80 are winning bets based at least in part on the number of units earned by various participants in the plurality of events. In the example discussed above, betting system platform 16 may determine whether the over bets 82A or under bets 82B for jockey Goodman are winning bets based at least in part on whether jockey Goodman earned more or less than 85 points, the index number 51 (or some other index number 51 for bets placed at step 116 after one or more of the races had occurred).

At step 122, betting system platform 16 may determine a payout amount for winning index bets 80 determined at step 120 based at least in part on the betting pool determined at step 110 and the total amount wagered on the winning index bets 80. Betting system platform 16 may also determine payouts for winning index bets 80 placed at step 116 after one or more events had occurred, based at least in part on the betting pools associated with such index bets 80. At step 124, clients 20 who made winning index bets 80 may collect their payouts through various betting system interfaces 14, such as tellers 30 or self-serving machines 33 at tracks or OTB establishments, or websites 36, for example.

FIG. 3 illustrates an example method of placing various index bets 80 in a spread betting system according to an embodiment of the present invention. At step 150, one or more types of spread-based index bets 80 are offered by betting system platform 16 for a plurality of events having a plurality of participants. Betting system platform 16 may provide a spread quote for index bets 80 on a particular participant. The spread quote may be defined by an upper index number and a lower index number associated with the total number of units potentially earned by the participant in the plurality of events. Betting system platform 16 may provide over bets 82A that are bets that the total number of units earned by the participant will be greater than the upper index number, and under bets 82B that are bets that the total number of units earned by the participant will be less than the lower index number.

For example, for a day of horse racing at London Downs, betting system platform 16 may offer spread-based over/under index bets 82 for jockey Jennings who is racing in six of the ten races on the race card for that day. Betting system platform 16 may assigns a spread quote of 45-48 points, where 48 is the upper index number and 45 is the lower index number. Thus, betting system platform 16 provides over bets 82A that are bets that the total number of units earned during the day by jockey Jennings will be greater than or equal to 48, and under bets 82B that are bets that the total number of units earned by the jockey Jennings will be less than or equal to 45.

At step 152, various information regarding the types of spread-based index bets 80 offered at step 150 may be communicated to clients 20 via various betting system interfaces 14 shown in FIG. 1, such as discussed above regarding step 102 of FIG. 2. In the example discussed above, the spread quote and/or various current bet data 50 for the over bets 82A and under bets 82B for jockey Jennings may be displayed on monitors 32 and websites 36.

At step 154, clients 20 may place spread-based index bets 80 using various betting system interfaces 14 shown in FIG. 1, such as tellers 30 or self-serving machines 33 at tracks or OTB establishments, or websites 36, for example. Each index bet 80 may be a particular quote (such as the upper index number or lower index number of a spread quote) and may have an associated unit stake. The quote of the index bet 80 corresponds with the total number of units potentially earned by the designated participant in the plurality of events. In the example discussed above, a first client 20 may place an over bet 82A on jockey Goodman at the upper quote of 48 points and with a unit stake of $10/point, and a second client 20 may place an under bet 82B on jockey Goodman at the lower quote of 45 points and with a unit stake of 15/point, At step 156, various information regarding the types of index bet 80 placed for the plurality of events may be updated in real-time, substantially in real-time, or at regular intervals based on index bets 80 placed by clients 20, such as discussed above regarding step 106 of FIG. 2.

At step 158, betting system platform 16 may close the betting on particular spread-based index bets 80 before the start of the first of the plurality of events covered by the particular index bets 80, such as the first race in a group of races, for example. In the example discussed above, betting system platform 16 may close the betting on over bets 82A and under bets 82B for jockey Jennings just before the start of the first race.

At step 160, the plurality of events covered by the index bets 80 occur, such as the running of a group of horse or car races, for example. In the example discussed above, the horse races at London Downs are run at step 160. At step 162, results of the events, including the positioning of the participants in each event, are received by betting system platform 16.

At step 164, additional index bets 80 may be offered and placed after one or more of the plurality of events have occurred. The terms of such late index bets 80, including the spread quote, may be different from the terms of the index bets 80 placed before the start of the first event. For example, the spread quote for such index bets 80 placed after one or more of the events has occurred may be adjusted based on the results of the events that have already occurred. In the example discussed above, over bets 82A and under bets 82B may be offered and placed after one or more of the races at London Downs, one or more of which jockey Jennings may have raced in.

At step 166, betting system platform 16 may determine the number of units earned various participants in the plurality of events based at least in part on the positioning of the various participants in each event. In the example discussed above, the total number of points earned by jockey Jennings during the day at London Downs is calculated based on the position of jockey Jennings in each of the races in which jockey Jennings participated.

At step 168, betting system platform 16 may determine which spread-based index bets 80 are winning bets based at least in part on the number of units earned by various participants in the plurality of events and the spread quote for the particular index bet 80. In the example discussed above, betting system platform 16 may determine whether the over bets 82A or under bets 82B for jockey Jennings are winning bets based at least in part on whether jockey Goodman earned less than 45 points, between 45 and 48 points, or more than 48 points.

At step 170, betting system platform 16 may determine a payout amount for winning spread-based index bets 80 determined at step 168 based at least in part on the unit stake and the quote of winning index bets 80, and the total number of units earned by the participant covered by the index bet 80. At step 172, clients 20 who made winning spread-based index bets 80 may collect their payouts through various betting system interfaces 14, such as tellers 30 or self-serving machines 33 at tracks or OTB establishments, or websites 36, for example.

Although embodiments of the invention and their advantages are described in detail, a person skilled in the art could make various alterations, additions, and omissions without departing from the spirit and scope of the present invention as defined by the appended claims.

What is claimed is:

1. An apparatus comprising:
a network interface to communicate with a remote server over a communication network;
a card reader;
a cash receiver;
a user interface;
a ticket dispenser;
a payment voucher dispenser;
at least one processor to:
receive, via the user interface, information indicative of a wager that a total number of units earned by a single participant of a plurality of racing events will be over or under total numbers of units earned by each one of a plurality of other participants in at least some of the plurality of racing events, the other participants being different from the single participant;
detect receipt of a wager amount via the card reader or the cash receiver;
transmit the information indicative of the wager to the remote server via the network interface;
print a ticket comprising the information indicative of the wager via the ticket dispenser;
determine an outcome of the wager; and
print a payment voucher with data indicative of a payout to be paid on the wager via the payment voucher dispenser, in response to determining that the total number of units actually earned by the single participant during the plurality of racing events satisfies the wager.

2. The apparatus of claim 1, wherein the total number of units being based at least in part on a finishing position of the single participant in each of the plurality of racing events.

3. The apparatus of claim 1, wherein the total number of units earned by the single participant comprises an amount of money earned by the single participant during the plurality of racing events.

4. The apparatus of claim 1, in which the single participant competes in at least two of the plurality of racing events, a second single participant competes in one or more of the plurality of racing events, a third single participant competes in one or more of the plurality of racing events, and the second, and third participants are different participants.

5. The apparatus of claim 4, in which at least one of the plurality of other participants do not compete in at least one of the plurality of racing events.

6. The apparatus of claim 1, wherein the at least one processor is further configured to: receive, via the network interface, data indicative of a position of the single participant; and determine a number of units earned by the single participant based at least on the position of the single participant and a unit distribution structure defining a distribution of units for each of a plurality of positions associated with each event.

7. The apparatus of claim 6, in which the unit distribution structure for each of the plurality of racing events comprises a purse distribution structure defining a distribution of a purse over a plurality of positions in each event.

8. The apparatus of claim 1, in which the at least one processor is further configured to: receive, via the network interface, after one or more of the plurality of racing events has occurred, information indicative of a second wager comprising a prediction about the total number of units that will be earned by the single participant during a set of remaining racing events, the set of remaining racing events comprising the plurality of racing events excluding the one or more of the plurality of racing events that have occurred, in which the information indicative of the second wager is received after a conclusion of a of the plurality of racing events and before a beginning of a second of the plurality of racing events.

9. The apparatus of claim 1, in which the at least one processor is further configured to, after a conclusion of at least a one of the plurality of racing events and before a beginning of at least has occurred and before a start of at least a second one of the plurality of racing events: receive, via the user interface, data indicative of a request to settle the wager; determine an amount of a settlement payment for the wager based at least in part on a position of the single participant in each of the plurality of racing events that has occurred; and print a ticket with data indicative of the settlement payment to be paid on the wager, wherein the wager is no longer eligible to win after the settlement payment is paid.

10. The apparatus of claim 1, in which the plurality of racing events comprises a plurality of horse races.

* * * * *